March 3, 1970 D. D. HOWARD 3,498,112
MICROWAVE SYSTEM FOR DETERMINING WATER CONTENT IN FUEL OIL
Filed April 30, 1968 2 Sheets-Sheet 1
FIG. 1
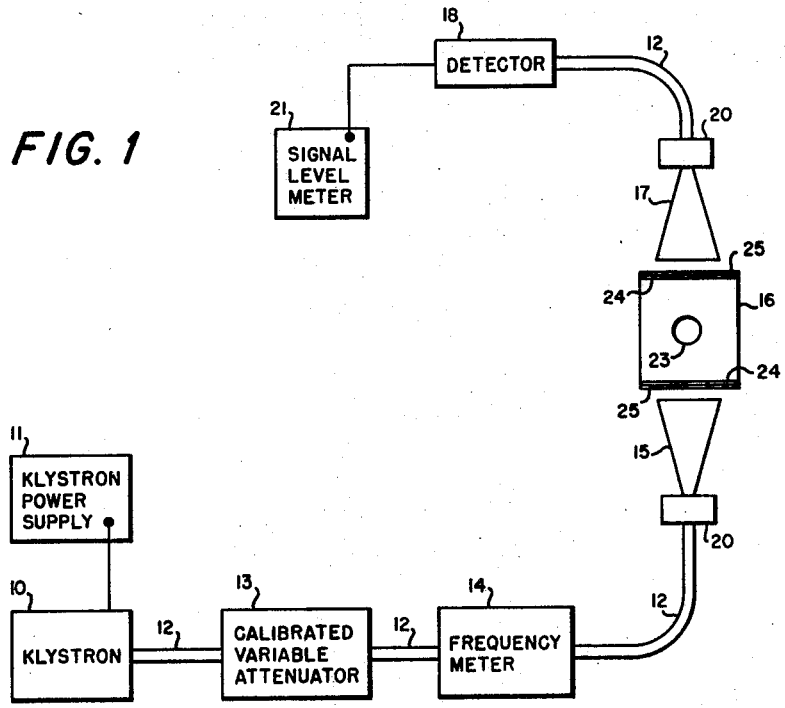
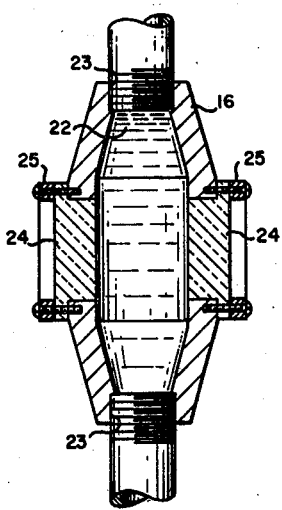
FIG. 2
INVENTOR
DEAN D. HOWARD
BY *Melvin L. Crane* AGENT
*[signature]* ATTORNEY

3,498,112
MICROWAVE SYSTEM FOR DETERMINING WATER CONTENT IN FUEL OIL

Dean D. Howard, Oxon Hill, Md., assignor to the United States of America as represented by the Secretary of the Navy
Filed Apr. 30, 1968, Ser. No. 725,353
Int. Cl. G01n 23/24
U.S. Cl. 73—61.1          2 Claims

ABSTRACT OF THE DISCLOSURE

In an apparatus for determining the water content of fuel oil, microwave energy is directed through a chamber through which the fuel oil passes and a measure of the attenuation of the microwave energy is made. The attenuation of microwave energy as it passes through the oil determines the amount of water contamination within the oil. The system operates in the millimeter wave range where there is little attenuation caused by uncontaminated oil and a high attenuation caused by even small amounts of water contamination.

---

The invention described herein may be manufactured and used by or for the Government of the United States of America for governmental purposes without the payment of any royalties thereon or therefor.

This invention is directed to a system for monitoring fuel oil for water contamination and more particularly to a microwave system for accurately monitoring fuel oil for water contamination.

Seawater contamination in fuel oil is a frequent occurrence in sea going vessels of the type in which fuel tanks are filled with seawater for ballast once the tanks are emptied of fuel. On draining and refilling with fuel, some water remains in the bottom of the tank and on use the water eventually mixes with the oil throughout the tank. Seawater contamination causes combustion residues to deposit on the boiler tubes which reduces boiler efficiency, reduces the ability of the ship to get under way rapidly and, under some conditions such deposits have caused furnace explosions. Not only does the residue affect operation of the furnaces, the residue is very difficult to remove. In order to prevent formation of residue and foul-up due to seawater contamination, it is desirable to detect the presence of seawater to avoid burning of fuel having seawater therein.

Several methods have been tried heretofore to detect seawater before entering the furnace, however, due to the lack of consistency in the mixtures of fuel oil from different parts of the world these prior systems are not satisfactory for all the different fuels. Therefore, it is desirable to provide a system which will accurately detect the presence of seawater in fuel oil regardless of which part of the world it is purchased.

The system of the present invention makes use of microwave energy which is propagated across a chamber through which the fuel oil flows to the burner or furnace. As the microwave energy passes through the fuel, the waves are scattered and dissipated by any water within the fuel. A measure of the dissipation and scattering loss determines the percent of water in the fuel. Using microwave energy of about 70 gigacycles per second (gc., a gigacycle is $10^9$ cycles per second) the percent of water in fuel oil may be determined to an accuracy of $\pm 0.25\%$ for approximately a 10 cm. sample depth. The sensitivity may be determined by the depth of the chamber through which the microwave energy passes.

It is therefore an object of the present invention to provide a system for monitoring fuel oil to determine water content.

Another object is to provide a monitoring system for determining water content of fuel oil having different characteristics.

Yet another object is to monitor fuel oil to prevent fouling the furnace for the boilers.

Still another object is to provide a simple effective monitoring system which is accurate for determining different amounts of water content in different fluids.

The nature of this invention as well as other objects and advantages thereof will be readily apparent from consideration of the following specification relating to the annexed drawings, in which:

FIG. 1 illustrates a schematic drawing of the various elements;

FIG. 2 is a chamber through which the microwaves are directed and through which the fuel flows.

Figure 3:
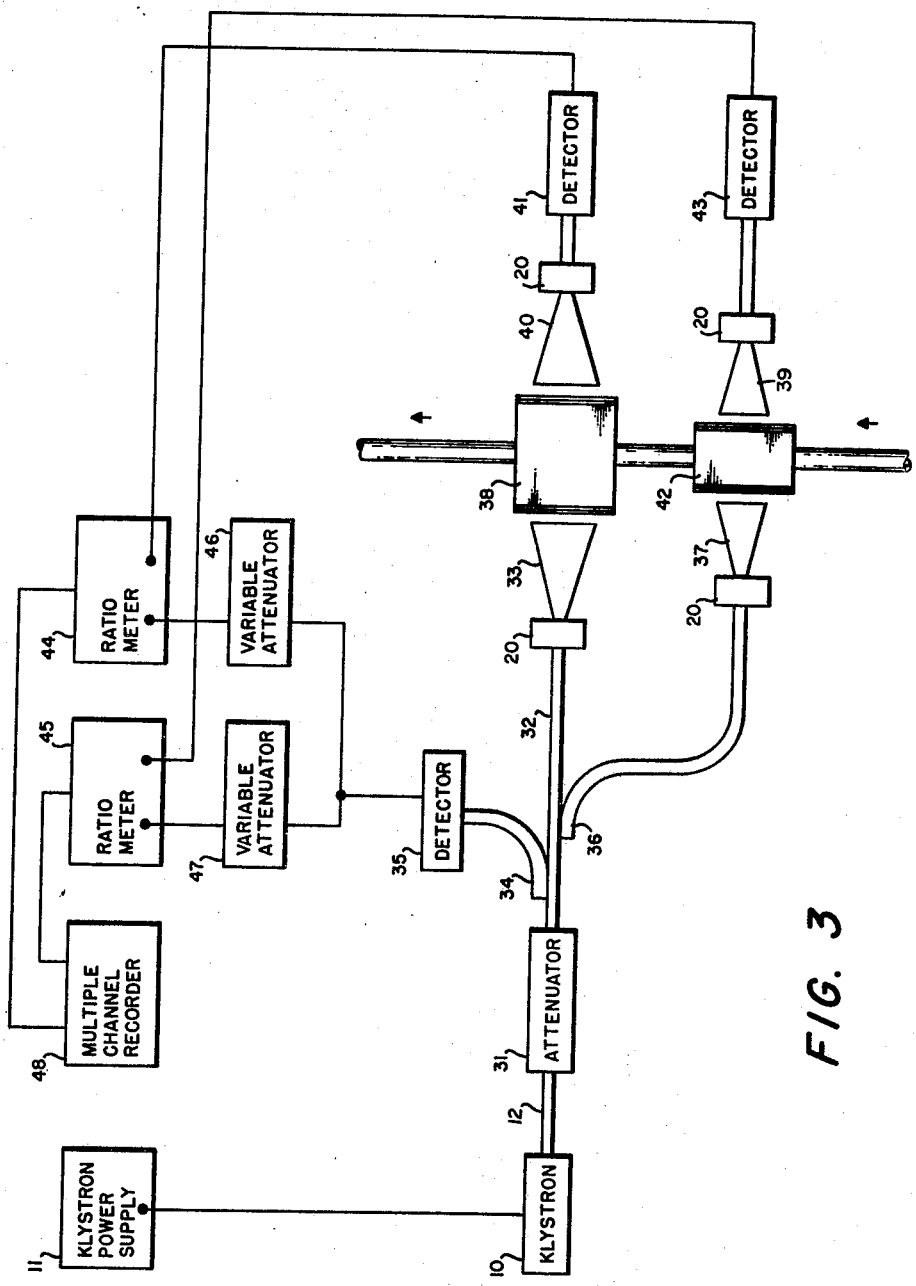
FIG. 3 is a schematic drawing of a system which provides greater dynamic range and is independent of drift in source signal level than that shown by illustration in FIG. 1.

Now referring to the drawings, there is shown by illustration, a system for detecting the presence of and amount of water in fuel oil directed to a furnace within a ship. As shown, a microwave source is produced by a klystron 10 which is operated by a suitable klystron power supply 11. A modulated power supply is used, typically a 1000 c.p.s. square wave with a corresponding meter tuned to 1000 c.p.s.

The microwave energy generated by the klystron is directed through a waveguide 12 into a calibrated variable attenuator 13 which is adjustable to provide a desired microwave energy from the source of about 70 gc. The microwave energy is directed through another waveguide section 12 to a frequency meter which measures the frequency to insure a satisfactory power output. The microwave energy from the frequency meter is directed through a waveguide section 12 into a microwave horn 15 which is positioned juxtaposed the fuel test chamber 16. Adjacent to the microwave horn, an E-H tuner 20 is used to match reflected energy from the sample surface and other source of signal reflection. The microwave energy is directed through the fuel chamber and is received by a microwave horn 17 on the opposite side of the fuel test chamber. The microwave energy is directed from the microwave horn 17 through a waveguide 12 to a detector 18. The detector 18 is provided with a suitable signal level detector 21 to indicate the energy passed through the fuel test chamber. The difference between the microwave energy incident on the fuel test chamber and that which passes through the test chamber is used to determine the presence and amount by percent of water contained in the fuel that passes through the fuel test chamber. The measure of the microwave energy received by the detector may be calibrated directly into percent of water present in the fuel oil.

The test chamber 16 as shown in FIG. 2 is constructed of dielectric material or metal with dielectric windows which has a passage 22 therethrough. Opposing holes 23 are drilled and threaded in the chamber normal to the passage 22 along its mid-point. The fuel lines for directing fuel into the furnace are connected to the drilled holes 23 such that fuel flowing to the furnace must pass through the test chamber. The ends of the passage 22 are closed by use of low-loss dielectric windows 24 which permit passage of the microwave energy with minimum loss. The windows may be held in place by end plates 25 which may be secured to the metal chamber by use of bolts, screws, or any other suitable means.

In operation the equipment is assembled and made operative with a fuel test chamber connected within a fuel line to a furnace. The calibrated variable attenuator is adjusted to provide the desired microwave energy such as 70 gc. The microwave energy passes through the fuel passing through the test chamber and the signal level meter represents a measure of the microwave energy that has passed through the test chamber and is detected by the detector. The value indicated by the signal level meter may be calibrated to indicate the amount by percent of water in the fuel passing through the fuel chamber.

Microwave energy is lost within the fuel chamber due to a conversion to heat in the water in the fuel and also due to scattering by water particles. Therefore calibration of the signal level meter with uncontaminated fuel oil; that is, fuel oil without any water therein, and with known amounts of water therein will provide an indication of the amounts of water in the fuel during testing of the fuel flow during normal use. Thus, in operation, the signal level meter will indicate the amount of water in the fuel and upon reaching a predetermined indicated amount of water, the fuel supply to the furnace may be changed to a different supply tank. Thus, the device will allow one to change over to a fresh supply of fuel oil prior to any harmful effects on the furnace. The system may be made with an automatic control or signal means that is actuated when the water content reaches a certain amount.

FIG. 3 illustrates a system having two detectors with two separate fuel test chambers 38 and 42, each having a different thickness through which the microwave energy is directed. With a like microwave energy source, the thicker fuel test chamber provides greater sensitivity. Therefore, for illustrative purposes, a test cell having a thickness of about 5 to 10 cm, depending on accuracy desired, will cover a percent water range of from 0–10%, whereas the thinner test cell having a thickness of about 1–4 cm. will cover the higher range such as from 0–100%. The system shown includes a klystron power supply 11 and a klystron 10 as shown in FIG. 1, and the attenuator 31 need not be adjustable. A waveguide 12 connects the klystron with the attenuator and a waveguide 32 connects the attenuator 31 to the microwave horn 33. As shown, the waveguide 32 is provided with a directional coupler 34 that directs microwave energy to a detector 35 without first passing through the fuel test cell and a directional coupler 36 which directs microwave energy to a microwave horn 37. The microwave horn 33 directs microwave energy through fuel test chamber or cell 38 which is received by microwave horn 40 and detected by a detector 41. The microwave horn 37 directs microwave energy through fuel test chamber 42 which is received by adjacent microwave horn 39 and detected by a detector 43. The output from detector 41 is directed to a ratio meter 44 and the output of detector 43 is directed to a separate ratio meter 45. The detector 35 directs an output signal to each of the ratio meters 44 and 45 through separate variable attenuators 46 and 47, the use of which will be explained later. Each of the ratio meters 44 and 45 have an output which is directed to separate channels of a multichannel recorder 48. As shown, fuel oil from a fuel line between a fuel tank and the furnace directs fuel through each of the fuel test cells 38 and 42. Therefore the same fuel passes through each of the separate test cells.

In operation of the system illustrated in FIG. 3, the elements are assembled and made operational. A source of uncontaminated fuel oil is passed through the fuel test cells. The attenuator 31 is such that a microwave energy of a desired value is directed into the adjoining waveguide. A portion of the energy will be directed along the main waveguide to the microwave horn 33 and a portion will be directed to detector 35 and the microwave horn 37 by the directional couplers 34 and 36, respectively. The detector 35 will measure the microwave output from the attenuator 31 and will direct a representative signal into each of the ratio meters 44 and 45. As mentioned above uncontaminated fuel oil is passed through the fuel test cells 42 and 38, thus the microwave energy directed through fuel test cells 38 and 42 by microwave horns 33 and 37, respectively, will be affected very little on passing through the fuel test cells. Therefore output signals from detectors 41 and 43 directed to the ratio meters 44 and 45, respectively, will be substantially the same but slightly less than the signal from detector 35. The variable attenuators 46 and 47 are adjusted until the ratio meters have an output value of unity which is recorded on the multichannel recorder. With the variable attenuators set such that the ratio meters are unity for uncontaminated fuel oil (or fuel oil that is free of water), any water in the fuel oil will dissipate some of the microwave energy passing through the fuel test cells whereby the detectors 41 and 43 will receives less energy than when uncontaminated fuel oil passes through the fuel test cells. Therefore the signals from the detectors 41 and 43 directed to the ratio meters 44 and 45 will be less than that received from detector 35. Therefore the outputs from the ratio meters will be less than unity and will be recorded by the multichannel recorder. The value indicated on the multichannel recorder will represent the amount of water by percent in the fuel oil.

Since the system makes use of ratio meters to determine any difference between the microwave energy that passes through the fuel test cells and that which does not pass through the fuel test cells, any change in the microwave source will not affect the recorded value because the changes will be the same. Therefore, the system is operative for accurate results even though the microwave energy source may be unstable.

The system as illustrated in FIG. 3 may be made with separate signal level meters such as described for the system in FIG. 1 rather than with ratio meters as described; however, accuracy may be affected due to changes in the microwave energy source which will not be balanced-out.

The best accuracy for operation of the illustrated systems is obtained by measuring dissipation characteristics of the fuel oil at the upper end of the microwave frequency range. Dissipation in this range is very low for uncontaminated fuel oil and is very sensitive to fuel oil with water contamination. Therefore for a less sensitive system the microwave frequency may be less than 70 gc. as set forth by illustration in the specification. Also, the illustrated systems provide an immediate measurement of water content in fuel oil and may be used for continuously monitoring of fuel oil flowing into a furnace from an oil storage tank.

The specification has been written referring to the detection of water in fuel oil. It is obvious that the system may be used to detect the presence of water in other fluids, gaseous or liquid by the same arrangement of elements.

Obviously many modifications and variations of the present invention are possible in the light of the above teachings. It is therefore to be understood that the invention may be practiced otherwise than as specifically described.

What is claimed and desired to be secured by Letters Patent of the United States is:

1. A system for monitoring a fluid to determine the presence and amount of water content, which comprises:
   first and second test cells within which a fluid may pass in succession,
   means for directing a microwave energy through each of said test cells,
   first and second microwave detecting means for respectively detecting microwave energy that passes through said first and second test cells and producing an output signal corresponding to the microwave energy detected,
a third microwave detector,
said third microwave detector detecting microwave energy directed to said first and second test cells and producing an output signal corresponding to the value of the microwave energy detected,
first and second ratio meters,
said first and second ratio meters receiving output signals respectively from said first and second microwave detecting means, and from said third microwave detector, and producing an output signal equal to the difference between the signals received, and
a multichannel recorder for recording output signals from said first and second ratio meters whereby the recorded signals represent the amount of water in a fluid passing through said test cells.

2. A system as claimed in claim 1, in which:
said second test cell through which microwave energy passes presents a path which is narrower than said first test cell.

References Cited

UNITED STATES PATENTS

| | | | |
|---|---|---|---|
| 2,869,357 | 1/1959 | Kritz | 73—53 X |
| 2,966,056 | 12/1960 | Heller | 73—53 X |
| 2,966,057 | 12/1960 | Heller | 73—53 X |
| 3,087,888 | 4/1963 | Saraceno | 73—53 X |
| 3,246,145 | 4/1966 | Higgins. | |

FOREIGN PATENTS

| | | |
|---|---|---|
| 887,556 | 1/1962 | Great Britain. |
| 968,561 | 9/1964 | Great Britain. |
| 1,078,504 | 8/1967 | Great Britain. |

LOUIS R. PRINCE, Primary Examiner

J. W. ROSKOS, Assistant Examiner

U.S. Cl. X.R.

73—73